United States Patent
Wadycki et al.

(10) Patent No.: US 9,104,670 B2
(45) Date of Patent: Aug. 11, 2015

(54) CUSTOMIZED SEARCH OR ACQUISITION OF DIGITAL MEDIA ASSETS

(75) Inventors: Andrew Wadycki, Santa Clara, CA (US); Jason Douglas, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 646 days.

(21) Appl. No.: 12/841,075

(22) Filed: Jul. 21, 2010

(65) Prior Publication Data

US 2012/0023095 A1    Jan. 26, 2012

(51) Int. Cl.
*G06F 17/30* (2006.01)

(52) U.S. Cl.
CPC ...... *G06F 17/30017* (2013.01); *G06F 17/3053* (2013.01)

(58) Field of Classification Search
CPC .......... G06F 17/30781; G06F 17/3005; G06F 17/30064; G06F 17/30699; G06F 17/30837; G06F 17/30017; G06F 17/3053; G06F 17/3082; G06F 17/30112
USPC .................................................. 707/723, 913
See application file for complete search history.

(56) References Cited

U.S. PATENT DOCUMENTS

| | | |
|---|---|---|
| 4,974,191 A | 11/1990 | Amirghodsi et al. |
| 5,128,672 A | 7/1992 | Kaehler |
| 5,282,265 A | 1/1994 | Rohra Suda et al. |
| 5,386,556 A | 1/1995 | Hedin et al. |
| 5,434,777 A | 7/1995 | Luciw |
| 5,479,488 A | 12/1995 | Lennig et al. |
| 5,577,241 A | 11/1996 | Spencer |
| 5,608,624 A | 3/1997 | Luciw |
| 5,682,539 A | 10/1997 | Conrad et al. |
| 5,727,950 A | 3/1998 | Cook et al. |
| 5,748,974 A | 5/1998 | Johnson |
| 5,794,050 A | 8/1998 | Dahlgren et al. |
| 5,826,261 A | 10/1998 | Spencer |
| 5,895,466 A | 4/1999 | Goldberg et al. |
| 5,899,972 A | 5/1999 | Miyazawa et al. |
| 5,915,249 A | 6/1999 | Spencer |

(Continued)

FOREIGN PATENT DOCUMENTS

| | | |
|---|---|---|
| EP | 1245023 (A1) | 10/2002 |
| JP | 06 019965 | 1/1994 |

(Continued)

OTHER PUBLICATIONS

Alfred App, 2011, http://www.alfredapp.com/, 5 pages.

(Continued)

*Primary Examiner* — Thanh-Ha Dang
(74) *Attorney, Agent, or Firm* — Kilpatrick Townsend & Stockton LLP

(57) ABSTRACT

Improved techniques for using usage data are disclosed. The usage data can pertain to a user of an electronic device. The usage data can be monitored and recorded on the electronic device. The improved techniques are particularly useful when the electronic device is a mobile electronic device. In one embodiment, the usage data can be used to enhance searching of digital assets, such as digital media assets, resident at a local or remote repository. In another embodiment, the usage data can be used to determine content to be resident locally on the electronic device. In still another embodiment, the usage data can be used to present (e.g., display) information on the electronic device.

21 Claims, 11 Drawing Sheets

(56) References Cited

U.S. PATENT DOCUMENTS

| | | |
|---|---|---|
| 5,987,404 A | 11/1999 | Della Pietra et al. |
| 6,052,656 A | 4/2000 | Suda et al. |
| 6,081,750 A | 6/2000 | Hoffberg et al. |
| 6,088,731 A | 7/2000 | Kiraly et al. |
| 6,144,938 A | 11/2000 | Surace et al. |
| 6,188,999 B1 | 2/2001 | Moody |
| 6,233,559 B1 | 5/2001 | Balakrishnan |
| 6,334,103 B1 | 12/2001 | Surace et al. |
| 6,421,672 B1 | 7/2002 | McAllister et al. |
| 6,434,524 B1 | 8/2002 | Weber |
| 6,446,076 B1 | 9/2002 | Burkey et al. |
| 6,453,292 B2 | 9/2002 | Ramaswamy et al. |
| 6,499,013 B1 | 12/2002 | Weber |
| 6,501,937 B1 | 12/2002 | Ho et al. |
| 6,513,063 B1 | 1/2003 | Julia et al. |
| 6,523,061 B1 | 2/2003 | Halverson et al. |
| 6,526,395 B1 | 2/2003 | Morris |
| 6,532,444 B1 | 3/2003 | Weber |
| 6,598,039 B1 | 7/2003 | Livowsky |
| 6,601,026 B2 | 7/2003 | Appelt et al. |
| 6,615,172 B1 | 9/2003 | Bennett et al. |
| 6,633,846 B1 | 10/2003 | Bennett et al. |
| 6,650,735 B2 | 11/2003 | Burton et al. |
| 6,665,640 B1 | 12/2003 | Bennett et al. |
| 6,691,111 B2 | 2/2004 | Lazaridis et al. |
| 6,691,151 B1 | 2/2004 | Cheyer et al. |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,778,951 B1 | 8/2004 | Contractor |
| 6,792,082 B1 | 9/2004 | Levine |
| 6,807,574 B1 | 10/2004 | Partovi et al. |
| 6,842,767 B1 | 1/2005 | Partovi et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,928,614 B1 | 8/2005 | Everhart |
| 6,937,975 B1 | 8/2005 | Elworthy |
| 6,964,023 B2 | 11/2005 | Maes et al. |
| 6,980,949 B2 | 12/2005 | Ford |
| 6,996,531 B2 | 2/2006 | Korall et al. |
| 7,027,974 B1 | 4/2006 | Busch et al. |
| 7,036,128 B1 | 4/2006 | Julia et al. |
| 7,047,233 B1 * | 5/2006 | Humphreys et al. .......... 707/752 |
| 7,050,977 B1 | 5/2006 | Bennett |
| 7,062,428 B2 | 6/2006 | Hogenhout et al. |
| 7,069,560 B1 | 6/2006 | Cheyer et al. |
| 7,092,928 B1 | 8/2006 | Elad et al. |
| 7,127,046 B1 | 10/2006 | Smith et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,904 B2 | 6/2007 | Luisi |
| 7,277,854 B2 | 10/2007 | Bennett et al. |
| 7,290,039 B1 | 10/2007 | Lisitsa et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,426,467 B2 | 9/2008 | Nashida et al. |
| 7,447,635 B1 | 11/2008 | Konopka et al. |
| 7,454,351 B2 | 11/2008 | Jeschke et al. |
| 7,475,010 B2 | 1/2009 | Chao |
| 7,483,894 B2 * | 1/2009 | Cao ........................................ 1/1 |
| 7,502,738 B2 | 3/2009 | Kennewick et al. |
| 7,526,466 B2 | 4/2009 | Au |
| 7,539,656 B2 | 5/2009 | Fratkina et al. |
| 7,546,382 B2 | 6/2009 | Healey et al. |
| 7,548,895 B2 | 6/2009 | Pulsipher |
| 7,555,431 B2 | 6/2009 | Bennett |
| 7,565,363 B2 * | 7/2009 | Anwar ................................. 1/1 |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,684,985 B2 | 3/2010 | Dominach et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,267 B2 | 4/2010 | Lisitsa et al. |
| 7,711,672 B2 | 5/2010 | Au |
| 7,716,056 B2 | 5/2010 | Weng et al. |
| 7,720,674 B2 | 5/2010 | Kaiser et al. |
| 7,725,307 B2 | 5/2010 | Bennett |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,752,152 B2 | 7/2010 | Paek et al. |
| 7,783,486 B2 | 8/2010 | Rosser et al. |
| 7,809,570 B2 | 10/2010 | Kennewick et al. |
| 7,818,176 B2 | 10/2010 | Freeman et al. |
| 7,822,608 B2 | 10/2010 | Cross, Jr. et al. |
| 7,831,426 B2 | 11/2010 | Bennett |
| 7,836,110 B1 * | 11/2010 | Schoenbach et al. ......... 707/829 |
| 7,840,400 B2 | 11/2010 | Lavi et al. |
| 7,873,519 B2 | 1/2011 | Bennett |
| 7,873,654 B2 | 1/2011 | Bernard |
| 7,881,936 B2 | 2/2011 | Longé et al. |
| 7,904,331 B2 * | 3/2011 | Keil et al. ........................ 705/7.32 |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,930,168 B2 | 4/2011 | Weng et al. |
| 7,933,338 B1 * | 4/2011 | Choudhry et al. ......... 375/240.26 |
| 7,949,529 B2 | 5/2011 | Weider et al. |
| 7,974,844 B2 | 7/2011 | Sumita |
| 7,983,917 B2 | 7/2011 | Kennewick et al. |
| 7,983,997 B2 | 7/2011 | Allen et al. |
| 7,987,151 B2 | 7/2011 | Schott et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,041,570 B2 | 10/2011 | Mirkovic et al. |
| 8,055,638 B2 * | 11/2011 | Schechter et al. ............. 707/705 |
| 8,055,708 B2 | 11/2011 | Chitsaz et al. |
| 8,060,524 B2 * | 11/2011 | Schechter et al. ............. 707/768 |
| 8,069,046 B2 | 11/2011 | Kennewick et al. |
| 8,073,681 B2 | 12/2011 | Baldwin et al. |
| 8,082,153 B2 | 12/2011 | Coffman et al. |
| 8,095,364 B2 | 1/2012 | Longé et al. |
| 8,107,401 B2 | 1/2012 | John et al. |
| 8,112,275 B2 | 2/2012 | Kennewick et al. |
| 8,200,663 B2 * | 6/2012 | Jones et al. ..................... 707/723 |
| 8,554,767 B2 * | 10/2013 | Song et al. ...................... 707/732 |
| 8,918,330 B1 * | 12/2014 | Winkler et al. .............. 705/14.16 |
| 2002/0065802 A1 * | 5/2002 | Uchiyama .......................... 707/1 |
| 2002/0073079 A1 * | 6/2002 | Terheggen ......................... 707/3 |
| 2002/0152200 A1 * | 10/2002 | Krichilsky et al. ................ 707/3 |
| 2003/0028889 A1 * | 2/2003 | McCoskey et al. ............. 725/91 |
| 2003/0123443 A1 * | 7/2003 | Anwar ........................... 370/392 |
| 2005/0071332 A1 * | 3/2005 | Ortega et al. ..................... 707/4 |

(56) References Cited

U.S. PATENT DOCUMENTS

| | | |
|---|---|---|
| 2005/0080625 A1 | 4/2005 | Bennett et al. |
| 2005/0119897 A1 | 6/2005 | Bennett et al. |
| 2006/0053095 A1* | 3/2006 | Koch et al. ............... 707/3 |
| 2006/0122834 A1 | 6/2006 | Bennett |
| 2006/0143007 A1 | 6/2006 | Koh et al. |
| 2006/0143236 A1* | 6/2006 | Wu ............... 707/104.1 |
| 2006/0248114 A1* | 11/2006 | Anderson et al. ......... 707/103 R |
| 2007/0055529 A1 | 3/2007 | Kanevsky et al. |
| 2007/0088556 A1 | 4/2007 | Andrew |
| 2007/0100790 A1 | 5/2007 | Cheyer et al. |
| 2007/0112740 A1* | 5/2007 | Geva ............... 707/3 |
| 2007/0156677 A1* | 7/2007 | Szabo ............... 707/5 |
| 2007/0185917 A1 | 8/2007 | Prahlad et al. |
| 2007/0282595 A1 | 12/2007 | Tunning et al. |
| 2008/0009268 A1* | 1/2008 | Ramer et al. ............... 455/412.1 |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0120112 A1 | 5/2008 | Jordan et al. |
| 2008/0140657 A1* | 6/2008 | Azvine et al. ............... 707/6 |
| 2008/0201227 A1* | 8/2008 | Bakewell et al. ............... 705/14 |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0300878 A1 | 12/2008 | Bennett |
| 2008/0301128 A1* | 12/2008 | Gandert et al. ............... 707/5 |
| 2009/0006343 A1* | 1/2009 | Platt et al. ............... 707/4 |
| 2009/0030800 A1 | 1/2009 | Grois |
| 2009/0058823 A1 | 3/2009 | Kocienda |
| 2009/0076796 A1 | 3/2009 | Daraselia |
| 2009/0100049 A1* | 4/2009 | Cao ............... 707/5 |
| 2009/0112647 A1* | 4/2009 | Volkert ............... 705/7 |
| 2009/0144153 A1* | 6/2009 | Kondrk et al. ............... 705/14 |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0199230 A1* | 8/2009 | Kumar et al. ............... 725/32 |
| 2009/0216805 A1* | 8/2009 | Coffman et al. ............... 707/104.1 |
| 2009/0240674 A1* | 9/2009 | Wilde et al. ............... 707/4 |
| 2009/0299745 A1 | 12/2009 | Kennewick et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0042603 A1* | 2/2010 | Smyros et al. ............... 707/4 |
| 2010/0095328 A1* | 4/2010 | Hartung et al. ............... 725/46 |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0268680 A1* | 10/2010 | Hangartner et al. ............... 706/46 |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0299303 A1* | 11/2010 | Horster et al. ............... 706/52 |
| 2010/0306249 A1* | 12/2010 | Hill et al. ............... 707/769 |
| 2010/0312547 A1 | 12/2010 | van Os et al. |
| 2010/0313215 A1* | 12/2010 | McCoskey et al. ............... 725/31 |
| 2010/0318576 A1 | 12/2010 | Kim |
| 2010/0332235 A1 | 12/2010 | David |
| 2011/0035374 A1* | 2/2011 | Vadrevu et al. ............... 707/728 |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0131036 A1 | 6/2011 | Di Cristo et al. |
| 2011/0131045 A1 | 6/2011 | Cristo et al. |
| 2011/0137910 A1* | 6/2011 | Hibino et al. ............... 707/741 |
| 2011/0144999 A1 | 6/2011 | Jang et al. |
| 2011/0161076 A1 | 6/2011 | Davis et al. |
| 2011/0175810 A1 | 7/2011 | Markovic et al. |
| 2011/0184730 A1 | 7/2011 | LeBeau et al. |
| 2011/0225151 A1* | 9/2011 | Annambhotla et al. ...... 707/724 |
| 2011/0231182 A1 | 9/2011 | Weider et al. |
| 2011/0231188 A1 | 9/2011 | Kennewick et al. |
| 2011/0276396 A1* | 11/2011 | Rathod ............... 705/14.49 |
| 2011/0279368 A1 | 11/2011 | Klein et al. |
| 2011/0296463 A1* | 12/2011 | Suslov ............... 725/44 |
| 2011/0306426 A1 | 12/2011 | Novak et al. |
| 2012/0002820 A1 | 1/2012 | Leichter |
| 2012/0005181 A1* | 1/2012 | Monteverde ............... 707/706 |
| 2012/0016678 A1 | 1/2012 | Gruber et al. |
| 2012/0020490 A1 | 1/2012 | Leichter |
| 2012/0022787 A1* | 1/2012 | LeBeau et al. ............... 701/527 |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |

FOREIGN PATENT DOCUMENTS

| | | |
|---|---|---|
| JP | 2001 125896 | 5/2001 |
| JP | 2002 024212 | 1/2002 |
| JP | 2003517158 (A) | 5/2003 |
| JP | 2009 036999 | 2/2009 |
| KR | 10-0776800 B1 | 11/2007 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10 2011 0113414 A | 10/2011 |
| WO | WO 2011/088053 A2 | 7/2011 |

OTHER PUBLICATIONS

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds And Plays Whatever You Ask For," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, 10 pages.

(56) References Cited

OTHER PUBLICATIONS

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/sunnmary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://Isro.epfl.ch/page-68384-en.html, 8 pages.

Guzzoni, D., et al., "Active, A Tool for Building Intelligent User Interfaces," ASC 2007, Palma de Mallorca, http://Isro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

(56) References Cited

OTHER PUBLICATIONS

Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions On Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, http://tomgruber.org/writing/ksl-95-69.pdf, 14 pages.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube, "Send Text, Listen To and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube, "Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice On The Go (BlackBerry)," 2:51 minute video uploaded to YouTube by VoiceOnTheGo on Jul. 27, 2009, http://www.youtube.com/watch?v=pJqpWgQS98w, 1 page.
International Search Report and Written Opinion dated Nov. 29, 2011, received in International Application No. PCT/US2011/20861, which corresponds to U.S. Appl. No. 12/987,982, 15 pages (Thomas Robert Gruber).
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/sunnmary?doi=10.1.1.16.3022, 4 pages.
*Phoenix Solutions, Inc. v. West Interactive Corp.*, Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16 . . . rep . . . , 4 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
U.S. Appl. No. 61/350,185, filed Jun. 1, 2010, 17 pages.

\* cited by examiner

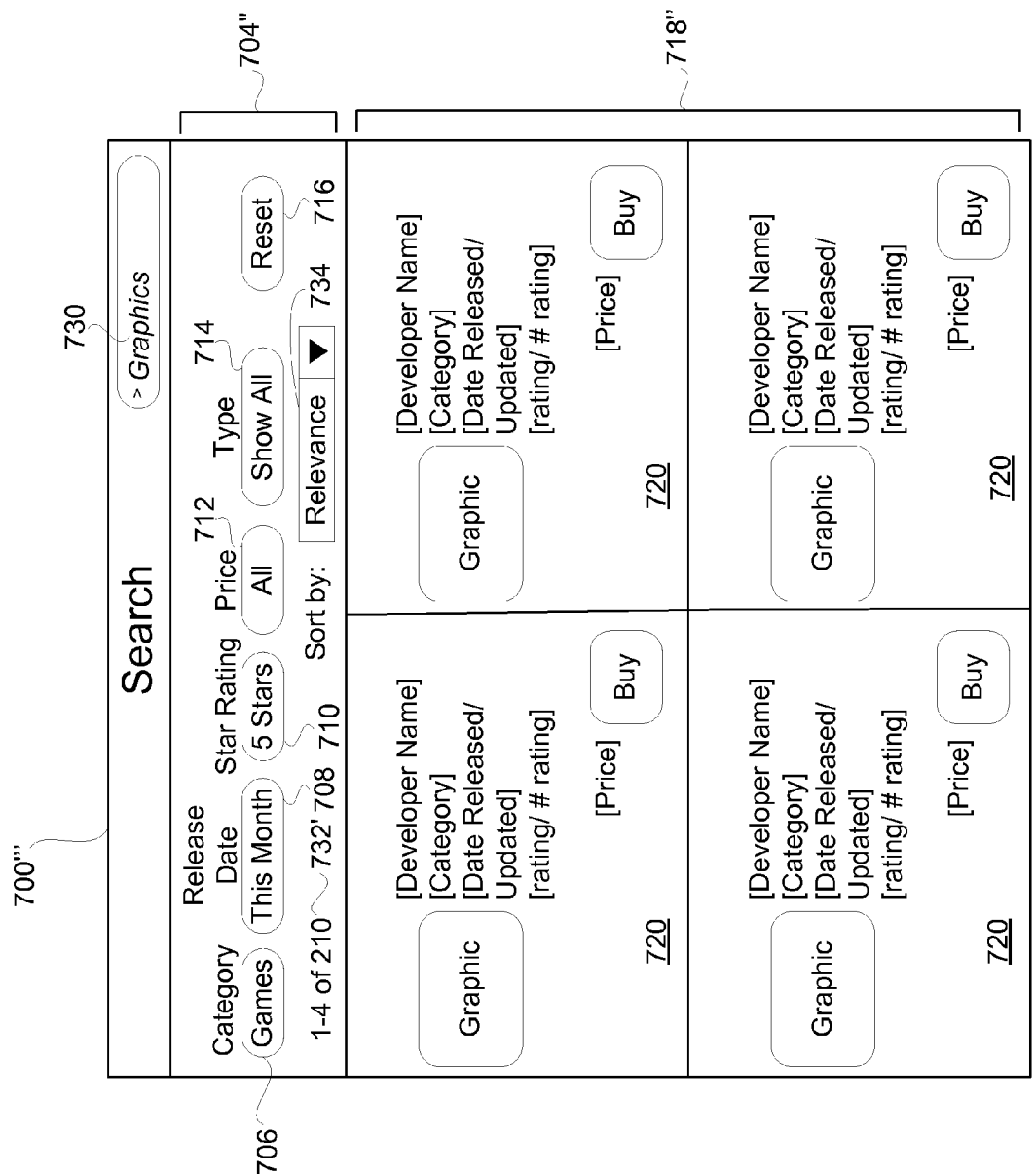

CUSTOMIZED SEARCH OR ACQUISITION OF DIGITAL MEDIA ASSETS

BACKGROUND OF THE INVENTION

Computerized searching is commonly used for searching through electronic files or searching of the World Wide Web. Searching can be performed using key words supplied by a user that is requesting a search. Upon receiving the key words for the search, a computer can perform a search for matching electronic files.

The results of the search are typically presented as a list of electronic files that include the keyword that has been searched. The electronic files in the list can be referred to as matching electronic files. The ordering of the matching electronic files within the list can be random, alphabetical, or by attribute (e.g., date, size, popularity or user rating). The results of the search are the same regardless of the user initiating the search.

Mobile computing devices are typically dependent upon network availability to access network-based resources (e.g., electronic files on the World Wide Web) or to communicate with other remote computing devices. Many users rely on constant network access to be able to communicate with other computing devices. With wireless networks, network access can be unavailable at certain locations or when there is an excess amount of network congestion. Network unavailability can frustrate users because the mobile computing devices have substantially curtailed capabilities when network access is unavailable.

Thus, there is a need for improved techniques to operate a computing device, such as a mobile computing device, so that search and/or network access capabilities are enhanced.

SUMMARY

The invention pertains to improved techniques for using usage data. The usage data can pertain to a user of an electronic device. The usage data can be monitored and recorded on the electronic device. The improved techniques are particularly useful when the electronic device is a mobile electronic device. In one embodiment, the usage data can be used to enhance searching of digital assets, such as digital media assets, resident at a local or remote repository. In another embodiment, the usage data can be used to determine content to be resident locally on the electronic device. In still another embodiment, the usage data can be used to present (e.g., display) information on the electronic device.

The invention can be implemented in numerous ways, including as a method, system, device, apparatus (including computer readable medium and graphical user interface). Several embodiments of the invention are discussed below.

As a method for providing digital media content to an electronic device, one embodiment can, for example, include at least monitoring usage of a first digital media asset having a plurality of levels or chapters, and comparing the usage of the first digital media asset to at least one trigger point. The embodiment can also include retrieving additional digital media data for use on the electronic device if the comparing determines that the usage of the first digital media asset exceeds the at least one trigger point.

As a computer readable storage medium, the computer readable storage medium can include at least computer program code executable by an electronic device to provide digital media content to the electronic device. According to one embodiment, the computer program code stored on the computer readable storage medium can, for example, include at least computer program code for monitoring usage of a first digital media asset having a plurality of levels or chapters, computer program code for comparing the usage of the first digital media asset to at least one trigger point, and computer program code for retrieving additional digital media data for use on the electronic device if the computer program code for comparing determines that the usage of the first digital media asset exceeds the at least one trigger point.

As a method for processing a user search, one embodiment can, for example, include at least receiving a user search request from an electronic device, where the user search request includes one or more search criteria. The embodiment also can include searching a database in accordance with the one or more search criteria to obtain search results, where the database includes digital asset information pertaining to a plurality of digital media assets. Furthermore, the embodiment can include accessing usage data pertaining to the electronic device or its user, ranking the search results based at least in part on the usage data, and presenting the ranked search results via the electronic device.

As a computer readable storage medium, the computer readable storage medium can include at least computer program code executable by an electronic device for processing a user search. According to one embodiment, the computer program code stored on the computer readable storage medium can, for example, include at least computer program code for receiving a user search request from an electronic device, the user search request including search one or more search criteria; computer program code for searching a database in accordance with the one or more search criteria to obtain search results, the database including digital asset information pertaining to a plurality of digital media assets; computer program code for accessing usage data pertaining to the electronic device or its user; computer program code for ranking the search results based at least in part on the usage data; and computer program code for presenting the ranked search results via the electronic device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIGS. 7A-7D illustrate exemplary search screens of a search GUI according to one embodiment.

DETAILED DESCRIPTION OF EMBODIMENTS OF THE INVENTION

Figure 1:
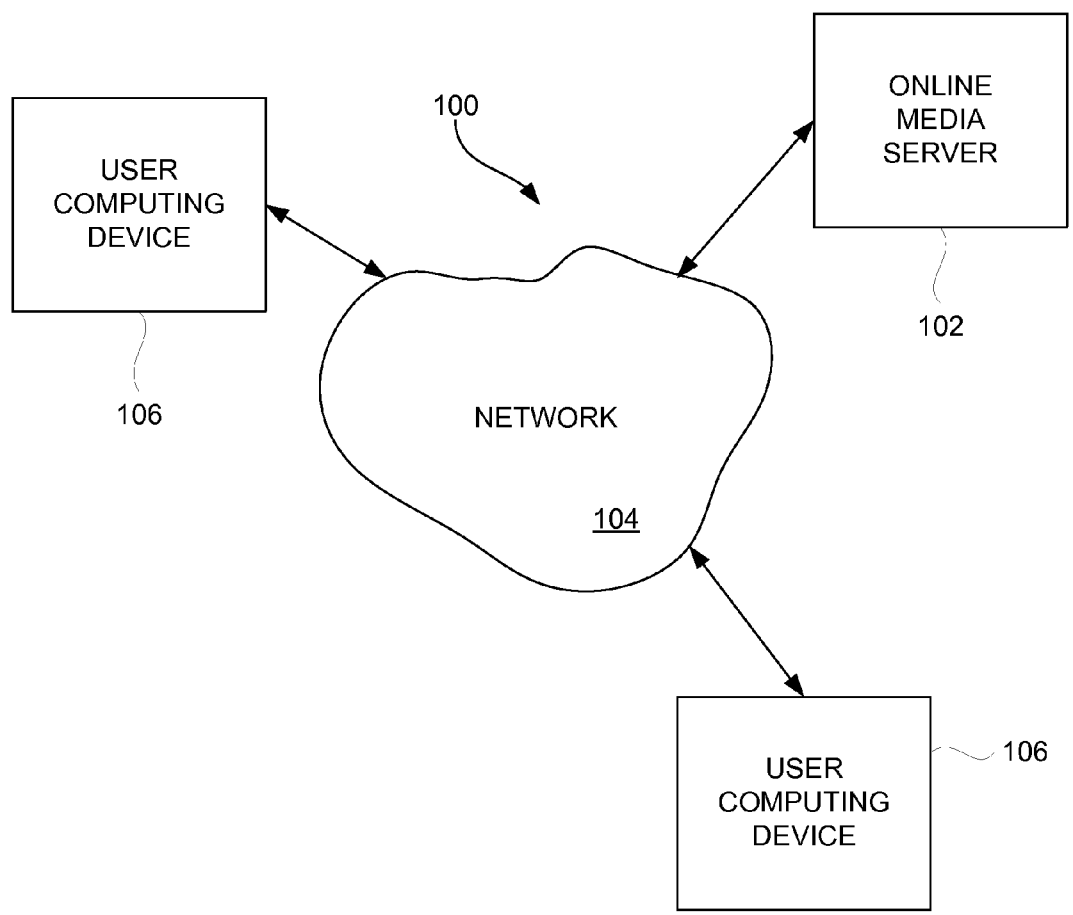
FIG. 1 is a block diagram of a digital asset access system according to one embodiment.

The invention pertains to improved techniques for using usage data. The usage data can pertain to a user of an electronic device. The usage data can be monitored and recorded on the electronic device. The improved techniques are particularly useful when the electronic device is a mobile electronic device. In one embodiment, the usage data can be used to enhance searching of digital assets, such as digital media assets, resident at a local or remote repository. In another embodiment, the usage data can be used to determine content to be resident locally on the electronic device. In still another embodiment, the usage data can be used to present (e.g., display) information on the electronic device.

The electronic device can, for example, be a computing device. Examples of a computing device include a personal computer (e.g., desktop computer, notebook computer, netbook computer, etc.), or a portable handheld electronic device (e.g., Portable Digital Assistant (PDA), portable media player, multi-function mobile telephone, etc.).

Several embodiments of the invention are discussed below with reference to FIGS. 1-7D. However, those skilled in the art will readily appreciate that the detailed description given herein with respect to these figures is for explanatory purposes as the invention can extend beyond these limited embodiments.

Electronic devices, in particular mobile electronic devices, have limited data storage capacity and users do not always plan ahead to have all the needed electronic data resident on their mobile electronic device. Network access, if available, enables access to digital data from anywhere via a network that would otherwise not be readily available. However, if network access is unreliable or unavailable, a user that has not properly planned ahead may be stuck in a situation where desired or needed data is unavailable. Also, if systems are desirous of providing data to users of mobile electronic devices, these systems are also dependent on network availability.

According to one aspect, predictive digital data acquisition can be used on electronic devices, in particular, mobile electronic devices. The predictive digital data acquisition can be used to acquire and at least temporarily store digital data that may be later desired, needed, promoted or offered. The prediction of digital data to be provided on a mobile electronic device can be determined using usage data that has been obtained through monitoring usage of the mobile electronic device. Thus, even though network access (e.g., wireless network) is unavailable, a user of a mobile electronic device is able to access digital data, such as digital assets, that have been predicatively stored on the mobile electronic device.

The digital data being predicatively acquired and stored can be considered to be cached at an electronic device, such as a mobile electronic device. A cache represents data storage that is provided for reduced memory access times. The digital data being "cached" can pertain to a plurality of digital assets, which can represent one or more types of digital assets.

One example of predictive digital data acquisition is for audiobooks. Usage data can, for example, concern data that is obtained by monitoring a user's usage of an e-book (or audiobook). In such an example, the usage data can estimate where the user is in "reading" the e-book via an electronic device. When the usage data indicates that the reader is nearing the end of the e-book, the predictive digital data acquisition can operate to acquire related digital data from one or more remote servers. The related digital data can be received via a network and stored on the electronic device. Thereafter, some or all of the related digital data can be presented to the user via the electronic device. The user can then subsequently preview, purchase, play, or review some or all of the related digital data without being then dependent on network availability. For instance, as a user completes a first e-book, a second e-book can be pre-stored on the electronic device in advance of any user request for such digital data. Hence, the second e-book is readily available at the electronic device regardless of network availability.

Another example of predictive digital data acquisition is for software games. Usage data can, for example, concern data that is obtained by monitoring a user's usage of a software game to estimate where the user is in "completing" the software game via an electronic device. When the usage data indicates that the user is close to "completing" the software game (such as approaching the end of the software game or approaching the need for another level, tool, feature, etc.), the predictive digital data acquisition can operate to acquire related digital data from one or more remote servers. The related digital data can be received and stored on the electronic device in advance and when the network is available. Thereafter, some or all of the related digital data can be utilized with the software game to the user via the electronic device. The user can then upgrade the software game or install another software game (e.g., a sequel game, a recommended game, etc.) using the related digital data efficiently without any need for network availability. For instance, as a user completes a first software game, an extension to the first software game or a second software game can be pre-stored on the electronic device in advance of any user request for such digital data.

Yet another example of predictive digital data acquisition is for podcasts or television shows. Usage data can, for example, concern data that is obtained by monitoring a user's usage of a particular podcast or television show. The usage data can estimate where the user is in viewing (or playback) of the particular podcast or television show via an electronic device (e.g., play position). When the usage data indicates that the user is nearing the end of the particular podcast or television show, the predictive digital data acquisition can operate to acquire related digital data from one or more remote servers. For example, the related digital data can pertain to a next or subsequent podcast or television show. The related digital data can be received via a network and stored on the electronic device. Thereafter, some or all of the related digital data can be presented to the user via the electronic device. The user can then preview, purchase, play, review some or all of the related digital data without being then dependent on network availability. For instance, as a user completes an episode or television show, a next episode or television show can be pre-stored on the electronic device in advance of any user request for such digital data such that it is available when the user completes the episode or television show.

More generally, as another example, usage data can be used to customize recommendations for a user. The user's electronic device can then operate to acquire digital data associated with the recommendations. The recommendations can be of various different kinds of digital data. A recommendation can also be for a preview of a digital media asset.

FIG. 1 is a block diagram of a digital asset access system 100 according to one embodiment. The digital asset access system 100 can include an online media server 102. The online media server 102 provides access to various digital assets. More particularly, the online media server 102 can manage access to store digital assets. The stored digital assets can be stored at the online media server 102 or stored remotely at a storage server (not shown). In one embodiment, the online media server 102 can enable networked-based access by computing devices for searching, browsing, purchasing, previewing or downloading the various stored digital assets.

The digital asset access system 100 also makes use of a network 104. The network 104 can include one or more wired networks and/or one or more wireless networks to facilitate data transfer between the online media server 102 and one more user computing devices 106.

According to one embodiment, the user computing devices 106 can each independently monitor usage data. The usage data can be stored and thus reside on the user computing device 106 and/or on the online media server 102 (or some other remote storage device). The usage data can be utilized to customize digital assets (or sets thereof) being provided to the particular user computing device 106. The determination of the customized digital assets can be performed at the user computing device 106 or at the online media server 102.

As one example, during a search through a plurality of digital assets, the usage data associated with the particular user computing device 106 that initiated the search can have the results of the search presented at the user computing device 106 such that the search results are customized for the user. For example, the user data associated with the user computing device 106 may indicate that the associated user is more interested in digital assets pertaining to television (TV) shows than digital assets pertaining to music. Hence, for such a user, the associated user computing device 106 can present the search results such that the TV shows within the results of the search can be more prominently presented to the user via the user computing device 106.

As another example, user computing device 106 can monitor usage data to intelligently maintain predicted digital assets on the user computing device 106. Here, in one embodiment, a portion of the local digital storage available to store digital assets at the user computing device 106 can be utilized to store digital assets that are predicted to be of potential interest to the user associated with the user computing device 106. In this case, those predicted digital assets can vary as the user data varies. In one implementation, the predicted digital assets can be acquired from the online media server 102 and electronically downloaded to the user computing device 106. The downloading of the predicted digital assets can be performed in a background mode since the user has at this time not made a specific request for these predicted digital assets.

Figure 2B:
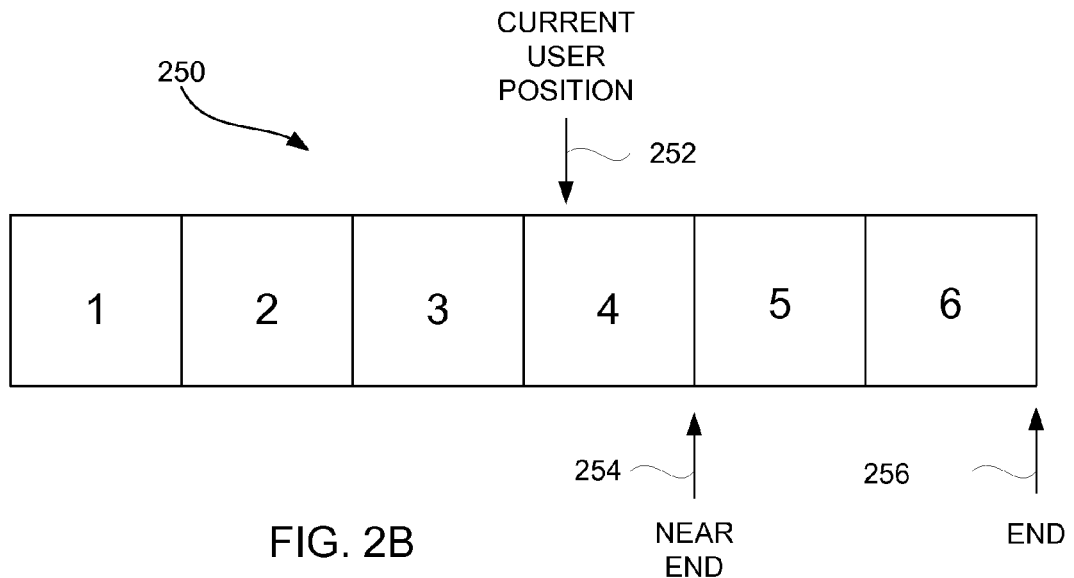
FIG. 2B is an illustrative view of a digital asset representation according to one embodiment.
Figure 2A:
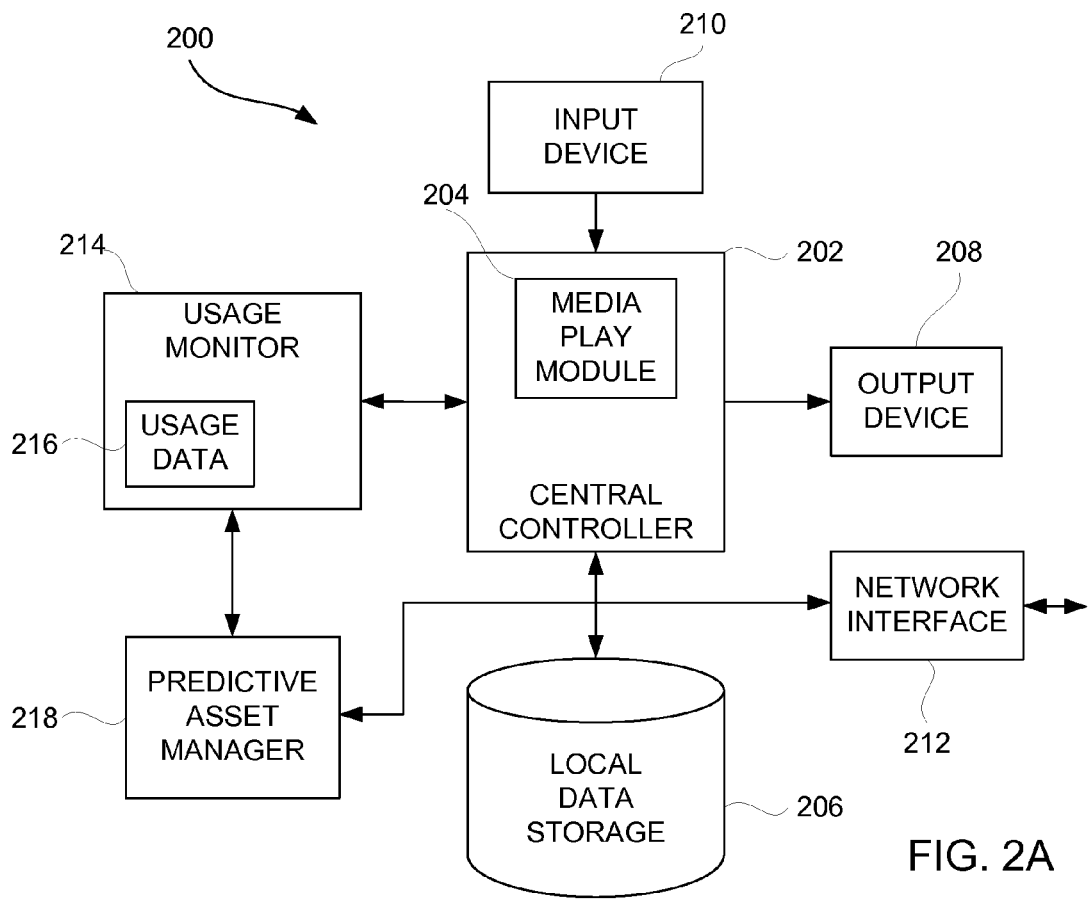
FIG. 2A is a block diagram of a user computing device according to one embodiment.

FIG. 2A is a block diagram of a user computing device 200 according to one embodiment. The user computing device 200 can, for example, represent the user computing device 106 illustrated in FIG. 1.

The user computing device 200 includes a central controller 202. The central controller 202, for example, can include a central processing unit (CPU). The central controller 202 can include support for media playback. Namely, the central controller 202 can include or operate to provide a media play module 204. The media play module 204 can operate to play a digital asset, such as a digital media asset, on the user computing device 200.

The user computing device 200 can include a local data storage 206. The local data storage 206 can store one or more digital assets, such as digital media assets. The media play module 204 can be controlled by the central controller 202 to play one or more of the digital assets stored in the local data storage 206. The output of the media play module 204 can be directed by the central controller 202 to an output device 208. An input device 210, such as a user input device, can be used to supply user inputs to the central controller 202 to designate a digital asset to be played by the media play module 204. The input device 210 can also be used to provide other user inputs to the central controller 202.

The user computing device 200 can also include a network interface 212. The network interface 212 can enable the user computing device 200 to interact with an online media server via a network, such as the online media server 102 and network 104 illustrated in FIG. 1. Consequently, the user computing device 200 can send commands, receive responses and/or receive digital assets from the online media server 102. The digital asset(s) being received from the online media 102 via the network can be stored to the local data storage 206. Alternatively, the digital asset(s) being received from the online media server 102 can be streamed to an output device 208.

The user computing device 200 can also include a usage monitor 214. The usage monitor 214 is provided within the user computing device 200 to monitor usage by a user of the user computing device 200. In doing so, the usage monitor 214 can record usage data 216. The usage data 216 can, in one embodiment, be stored within the usage monitor 214 as shown in FIG. 2A. Alternatively or additionally, the usage data 216 can be stored to the local data storage 206.

The user computing device 200 can also include a predicted asset manager 218. The predicted asset manager 218 can predict one or more digital assets that are likely to be of interest to the user of the user computing device 200. The predicted asset manager 218 can make use of the usage data 216 acquired by the usage monitor 214. The usage data 216 can be acquired and manipulated or updated over time to provide a reliable data set used to predict digital assets likely to be of interest to the user. These predicted digital assets can be obtained from a remote server, such as the online media server 102 via the network interface 212. Upon receiving the predicted digital assets, the predicted digital assets can be stored to the local data storage 206. Typically, as noted above, a portion of the local data storage 206 can be dedicated to storage of predicted digital assets. Hence, it may be necessary to delete or remove a portion of the predicted digital assets previously stored in the dedicated portion of the local data storage 206 so that more recently predicted digital assets can be stored in the portion of the local data storage 206.

FIG. 2B is an illustrative view of a digital asset representation 250 according to one embodiment. The digital asset representation 250 represents a digital asset having a sequential arrangement of sections. These sections can correspond to chapters, tracks, episodes, shows, levels and the like. In the example illustrated in FIG. 2B, the digital asset representation includes six (6) sections. As a user consumes a digital asset, such as through playing the digital asset, a current user position 252 can be recorded and associated with the particular digital asset. Hence, if the user consumes (e.g., views, hears, etc.) a portion of the digital asset and then stops, then when the user later begins to again consume a subsequent portion of the digital media asset, the user can continue at the point at which he previously stopped. The starting position for resuming the consumption of the digital asset can be noted and recorded by the current user position 252.

The current user position 252 for the digital asset can be included within the usage data associated with the user of the user computing device that is consuming (e.g., playing) the digital asset being represented by the digital asset representation 250. The usage monitor 214 can track and record the current user position 252. In addition, the usage monitor 214 can also support one or more trigger points for a given digital asset. The trigger points are positions of a playback or usage of a digital asset. Typically, although not necessarily, the one or more trigger points are provided towards the end of a consumption of the digital asset. For example, a near end marker 254 can be associated with the digital asset. When the current user position 252 exceeds the near end marker 254, it can be denoted that the usage of the digital asset is nearing completion. In such cases, the usage monitor 214 can signal the predictive asset manager 208. The predicted asset manager 208 can then operate to acquire one or more related digital assets that are related to the digital asset being consumed.

The predicted asset manager 218 can cause predicted digital assets to be obtained from a remote media server and stored to a portion of the local data storage 206. For example, the predicted asset manager 218 can predict (e.g., using a trigger point, such as a near-end marker 254) that the user will soon desire to acquire information about a related digital asset to the digital asset being consumed. Hence, one or more related digital assets can be obtained from a remote server and downloaded via the network interface 212 to the local data storage 216 where the one or more related digital assets can reside at least temporarily in the event that the user computing device 200 (by user request or programmatic request) attempts to access such digital assets.

Thereafter, by another subsequent trigger point, by programmatic request or by user request, the central controller 202 can, for example, cause customized information to be presented to the user by way of the output device 208. For example, the output device 208 can present information about other digital assets that are related to the digital asset being consumed. Here, the one or more related digital assets obtained in advance by the predicted asset manager 218 can be accessed from the local data storage 206 by the central controller 202 and presented on the output device 208.

Figure 3:
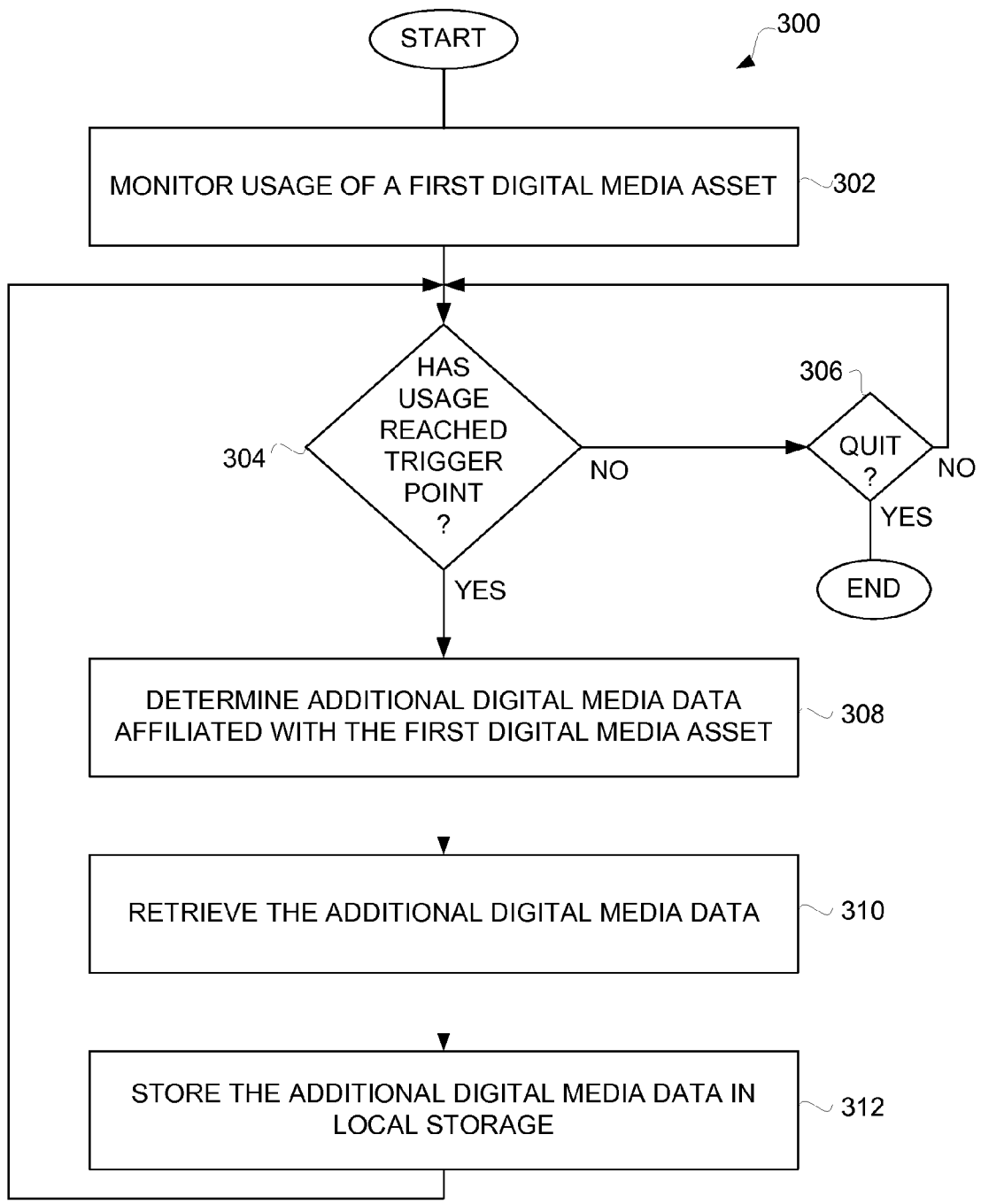
FIG. 3 is a flow diagram of a data acquisition process according to one embodiment.

FIG. 3 is a flow diagram of a data acquisition process 300 according to one embodiment. The data acquisition process 300 can be performed by a user computing device, such as the user computing device 106 illustrated in FIG. 1.

The data acquisition process 300 can monitor 302 usage of a first digital media asset. Here, as the first digital media asset is being consumed at the user computing device, the usage thereof can be monitored 302. Usage can be evaluated based on the usage data. In one embodiment, the usage is as to a particular digital media asset (e.g., the first digital media asset); however, in other embodiments, usage can be generally applicable to a user or a category of digital assets. The usage monitoring 302 can cause usage data to be stored at the user computing device. Next, a decision 304 can determine whether usage has reached a trigger point. As an example, a trigger point can correspond to a near-end trigger point or an end trigger. When the decision 304 determines that usage has not reached a trigger point, a decision 306 can determine whether the data acquisition process 300 should quit. When the decision 306 determines that the data acquisition process 300 should quit, the data acquisition process 300 can end. Alternatively, when the decision 306 determines that the data acquisition process 300 should not quit, the data acquisition process 300 returns to repeat the block 302 and subsequent blocks so that usage of the first digital media asset can be continuously monitored 302.

Once the decision 304 determines that usage has reached a trigger point, additional digital media data affiliated with the first digital media asset can be determined 308. Although the nature of the affiliation can differ depending upon implementation, in one example, the first digital media asset can pertain to an audio e-book and the additional digital media data can pertain to an audio e-book from the same author. As another example, the first digital media asset can pertain to a television show and the additional digital media data can pertain to a subsequent show of the same television series.

After the additional digital media data has been determined 308, the additional digital media data can be retrieved 310. For example, the additional digital media data can be retrieved 310 from a remote media server, such as the online media server 102. The additional digital media data can then be stored 312 in local storage (e.g., local data storage 206). Following block 312, the data acquisition process 300 can return to repeat the block 302 and subsequent blocks so that usage can be monitored and so that appropriate additional digital media data can be determined, retrieved and stored so that it is readily accessible from the local storage at the user computing device.

Figure 4A:
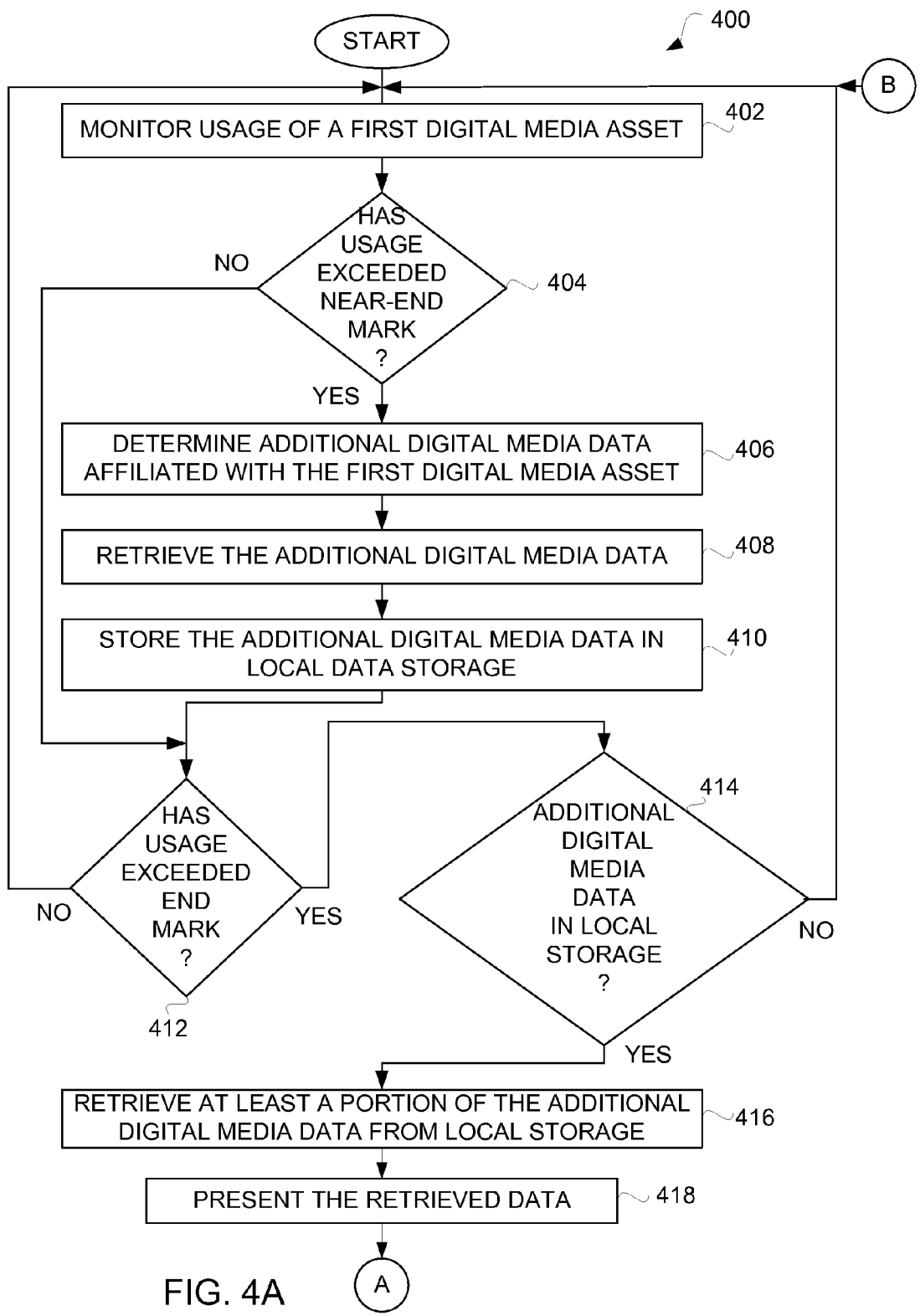
FIGS. 4A and 4B are flow diagrams of a data retrieval process according to one embodiment.
Figure 4B:
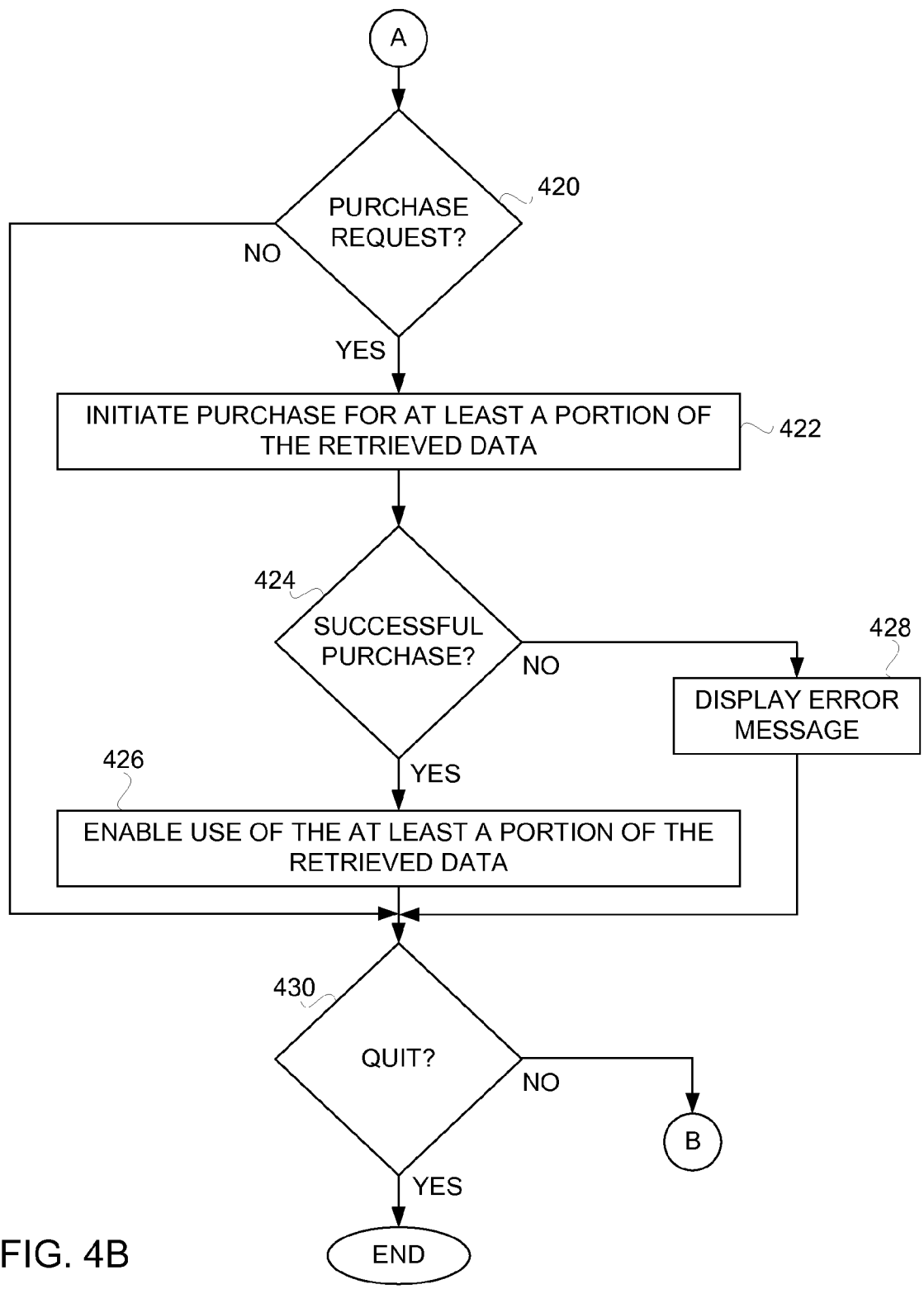

FIGS. 4A and 4B are flow diagrams of a data retrieval process 400 according to one embodiment. The data retrieval process 400 can, for example, be performed by a user computing device, such as the user computing device 106 illustrated in FIG. 1.

The data retrieval process 400 can monitor 402 usage of a first digital media asset at the user computing device. A decision 404 can determine whether usage of the first digital media asset being monitored 402 has exceeded a near-end mark. A near-end mark is one implementation of a trigger point, where the trigger point is positioned near the end of a digital media asset. For example, a near-end trigger point can be provided at any position of a digital media asset that is prior to its end. Typically, the position of the near-end trigger depends on the particular type of digital media asset and how fast it is (or can be) consumed. In a first example, a user might be progressing slowly through a digital media asset (e.g., audiobook, game), while another user might progress faster through a digital media asset. Here, in the first example, the near-end trigger for the "fast progressor" would perhaps be set further from the end than then the near-end trigger for the "slow progressor". In a second example, a digital media asset having of 30 minutes duration can use a trigger point that is farther from its end point as a percentage of its content than would, in one embodiment, be the case for another digital media asset having 3 hours duration.

When the decision 404 determines that usage of the first digital media asset has exceeded the near-end mark, additional digital media data affiliated with the first digital media asset can be determined 406. The additional digital media data can be retrieved 408 from a remote storage. For example, the remote storage can pertain to any network-accessible data storage device or system. The additional digital media data can be stored 410 in the local data storage of the user computing device.

Thereafter, a decision 412 can determine whether usage of the digital media asset had exceeded an end-mark. When the decision 412 determines that usage has exceeded the end mark, a decision 414 can determine whether additional digital media data is already stored in local storage. When the decision 414 determines that the additional digital media data is stored in local storage, the data retrieval process 400 returns to repeat the block 402 and subsequent blocks. Also, when the decision 412 determines when the usage has not exceeded an end mark, the data retrieval process 400 can also return to repeat the block 402.

On the other hand, when the additional digital media data is available from local storage, at least a portion of the additional digital media data can be retrieved from the local storage. The retrieved data can then be presented 418. Here, the retrieved data can pertain to data that was previously predicted to be of interest to the user of the user computing device and thus pre-stored in the user computing device. Hence, the retrieved data can be presented 418 to the user by way of the user computing device, such as by displaying the retrieved data or by playing the retrieved data.

In one implementation, the presentation 418 of the retrieved data can present to the user an opportunity to purchase at least a portion of the retrieved data. In this regard, a decision 420 can determine whether a purchase request with respect to the retrieved data has been received. When the decision 420 determines that a purchase request has been received, purchase of at least a portion of the retrieved data can be initiated 422. A decision 424 can then determine whether purchase of the at least a portion of the retrieved data has been successful. When the decision 424 determines that the purchase has been successful, the data retrieval process 400 can operate to enable 426 use of the at least a portion of the retrieved data.

On the other hand, when the decision 424 determines that purchase of at least the portion of the retrieved data has not been successful, an error message can be displayed 428. Typically, the error message would be displayed at the user computing device. Following the block 426 or following the block 428, and as well as following the decision 420 if a purchase request is not received, a decision 430 can determine whether the data retrieval process 400 should quit. When the decision 430 determines that the data retrieval process 400 should not quit, the data retrieval process 400 can return to repeat the block 402 and subsequent blocks so that the data retrieval process 400 can be continuously performed. However, it should be noted that in other embodiments, the data retrieval process 400 need only be occasionally or less frequently performed. Alternatively, when the decision 430 determines that the data retrieval process 400 should quit, the data retrieval process 400 can end.

Conventionally, searches of digital assets are not performed differently for different users. That is, the search results are the same regardless of the user requesting the search. However, it may be advantageous to provide search results that are customized for particular users, whereby the search results can differ for different users. Hence, according to another aspect, improved search processing can be provided by customizing search results based on characteristics, interests, tendencies or preferences of particular users. In one embodiment, a search of digital assets being requested by a user can be performed in view of usage data associated with the requesting user. For example, results of a search can be ranked in accordance with the usage data. The usage data can result from monitoring usage of an electronic device (e.g., mobile electronic device).

Figure 5:
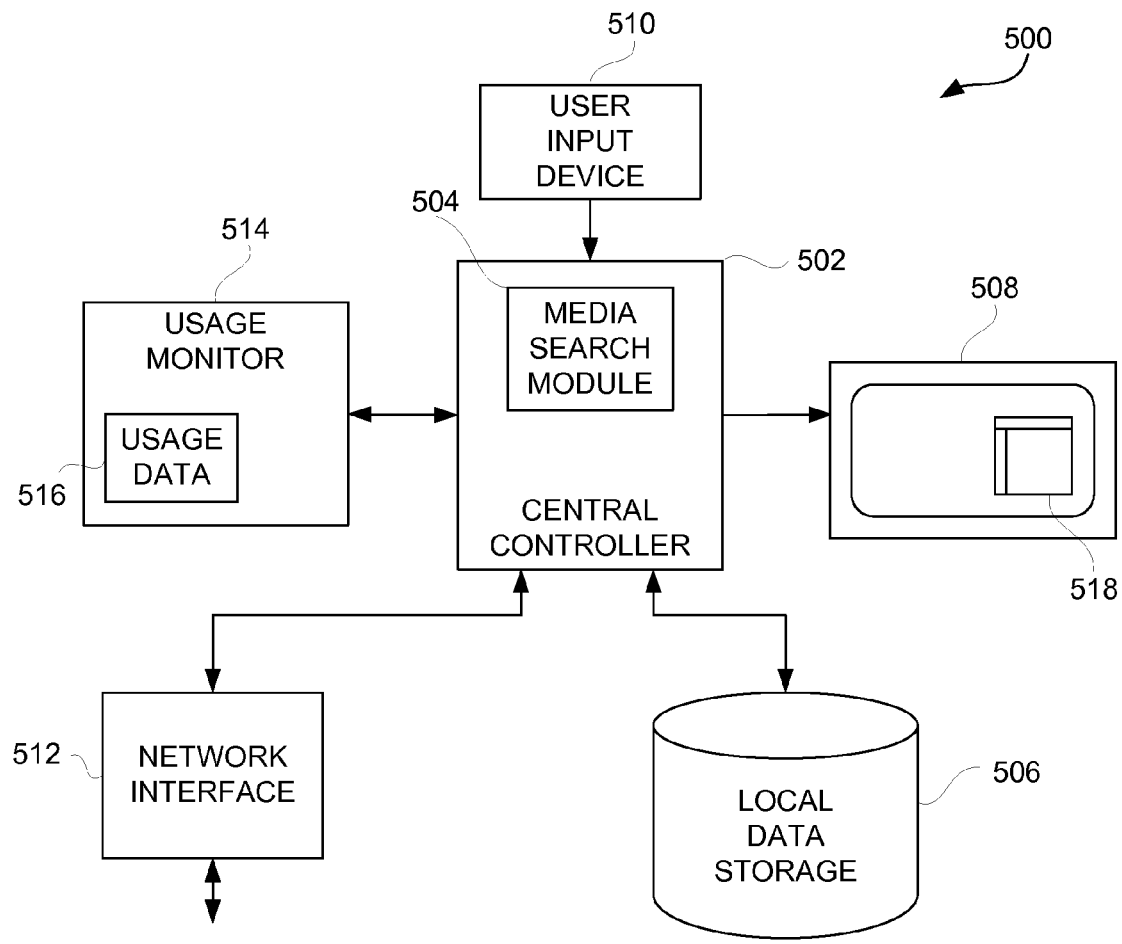
FIG. 5 is a block diagram of a user computing device according to another embodiment.

FIG. 5 is a block diagram of a user computing device 500 according to another embodiment. The user computing device 500 includes a central controller 502. The central controller 502, for example, can include a central processing unit (CPU). The central controller 502 can include support for data searching, such as searching digital media assets. Namely, the central controller 502 can include or operate to provide a media search module 504. The media search module 504 can operate to search a repository of digital media assets. The repository of digital media assets can, for example, be a remote media storage server or a local media library at the user computing device 500.

The user computing device 500 can include a local data storage 506. The local data storage 506 can store one or more digital assets, such as digital media assets. Those digital media assets stored to the local data storage 506 can be referred to as a local media library.

The media search module 504 can be controlled by the central controller 502 to search through the digital assets stored in the local data storage 206 (i.e., the local media library). The search results from the media search module 504 can be directed by the central controller 502 to an output device 508. An input device 510, such as a user input device, can be utilized by the central controller 502 to designate one or more search criteria to be used by the media search module 504. The input device 510 can also be used to provide other user inputs to the central controller 502.

The user computing device 500 can also include a network interface 512. The network interface 512 can enable the user computing device 500 to interact with online media server via a network, such as the online media server 102 and the network 104 illustrated in FIG. 1. Consequently, the user computing device 500 can send commands, received responses and/or receive digital assets from the online media server 102. The digital asset(s) being received from the online media 102 via the network can be stored to the local data storage 206. Alternatively, the digital asset(s) being received from the online media server 102 can be streamed to an output device 208. The media search module 504 can be used to search digital assets available from the online media server 102.

The user computing device 50 can also include a usage monitor 514. The usage monitor 514 is provided within the user computing device 500 to monitor usage by the user of the user computing device 500. In doing so, the usage monitor 514 can record usage data 516. The usage data 516 can be stored with in the usage monitor 514 as shown in FIG. 5. Alternatively or additionally, the usage data 516 can be stored to the local data storage 506. The usage data 516 can be acquired and manipulated or updated over time to provide a reliable data set that can be used to assist in customizing search results for the user.

Figure 6:
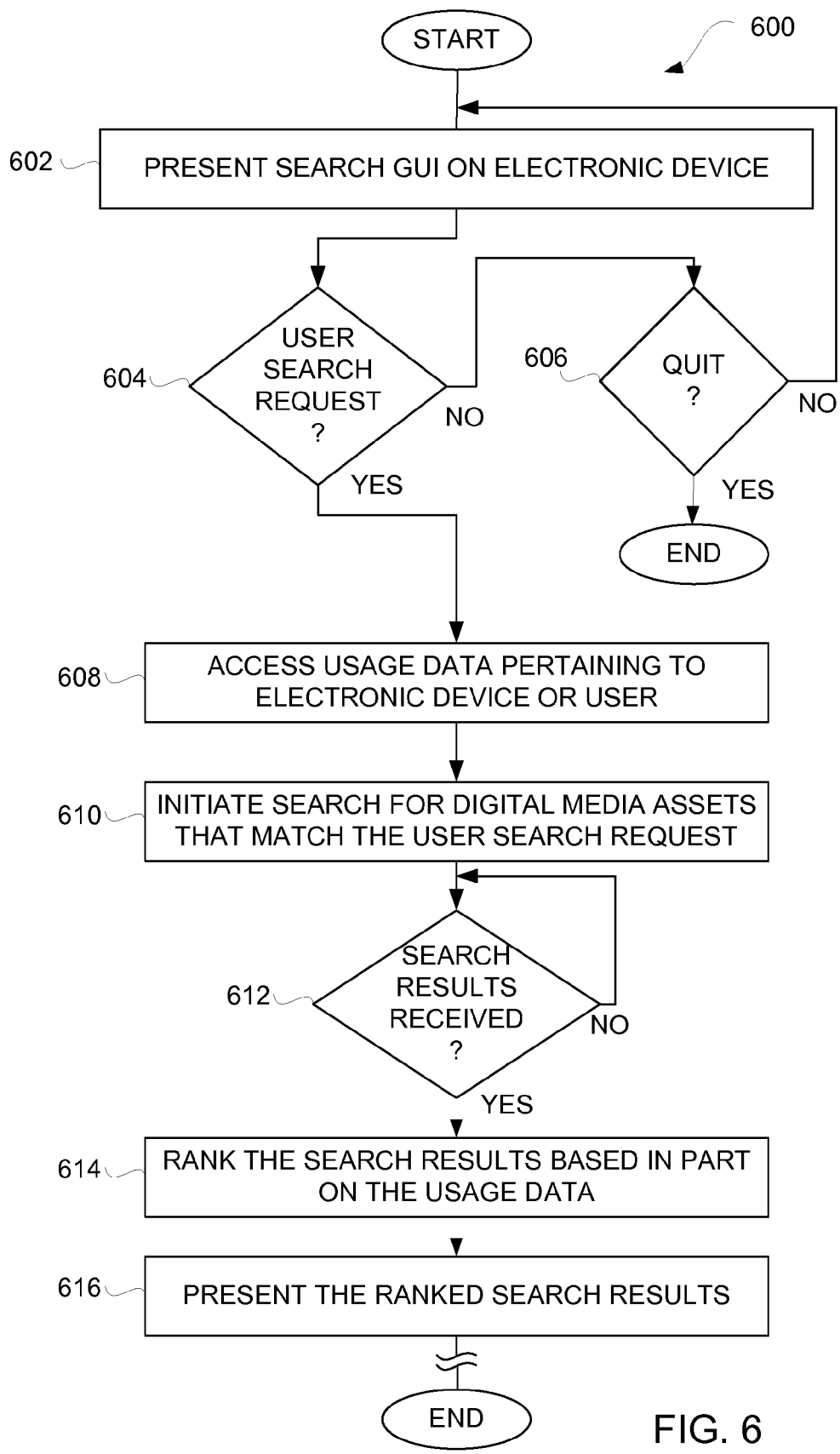
FIG. 6 is a flow diagram of a customized search process according to one embodiment.

FIG. 6 is a flow diagram of a customized search process 600 according to one embodiment. The customized search process 600 can, for example, be performed by an electronic device, such as the user computing device 106 illustrated in FIG. 1.

The customized search process 600 can present 602 a search graphical user interface (GUI) on the electronic device. The search GUI enables a user to request a user search. Typically, a user would interact with the search GUI to enter one or more search criteria into one or more user input regions prior to requesting that a search be performed. After the search GUI has been presented 602, a decision 604 can determine whether a user search request has been received at electronic device. When the decision 604 determines that a user search request has not been received, a decision 606 can determine whether the customized search process 600 should quit. When the decision 606 determines that the customized search process 600 should quit, the customized search process 600 can end. Alternatively, when the decision 606 determines that the customized search process 600 should not quit, then the customized search process 600 returns to repeat the block 602 and subsequent blocks so that the user has the ability to interact with the search GUI to provide a user search request.

Once the decision 604 determines that a user search request has been received, usage data pertaining to the electronic device or its user can be accessed 608. Next, a search for digital media assets that match the user search request can be initiated 610. After a search has been initiated 610, a decision 612 can determine whether search results have been received. When the decision 612 determines that search results have not yet been received, the customized search process 600 can await such search results.

On the other hand, when the decision 612 determines that search results have been received, the search results can be ranked 614 based in part on the usage data. The usage data can, upon evaluation, suggest content that is more likely to be of interest to the user of the electronic device. Hence, these search results can be ranked 614 such that those of the digital assets within the search results that are more likely to be of interest to the user (e.g., based on the usage data) can be ranked higher than other digital assets within the search results. Thereafter, the ranked search results can be presented 616. For example, the ranked search results can be displayed on a display device associated with the electronic device. After the ranked search results have been presented 616, the customized search process 600 can end. However, in some embodiments, prior to ending the customized search process 600, additional processing could be performed to present additional ones of the ranked search results, to preview one or more of the digital assets within the ranked search results, and/or to purchase one or more of the digital assets within the ranked search results.

In the customized search process 600, the search results can be ranked 614 at the electronic device (e.g., user computing device 106) after the search results are received. Alternatively, the search and the ranking can be performed by a remote server prior to returning the search results to the electronic device.

Another aspect of the invention is a search graphical user interface (GUI). The search GUI can facilitate a user requesting a search and/or presenting results of a search to the user. FIGS. 7A-7D illustrate exemplary search screens of a search GUI according to one embodiment. The search GUI can be displayed on a display device associated with an electronic device.

Figure 7A:
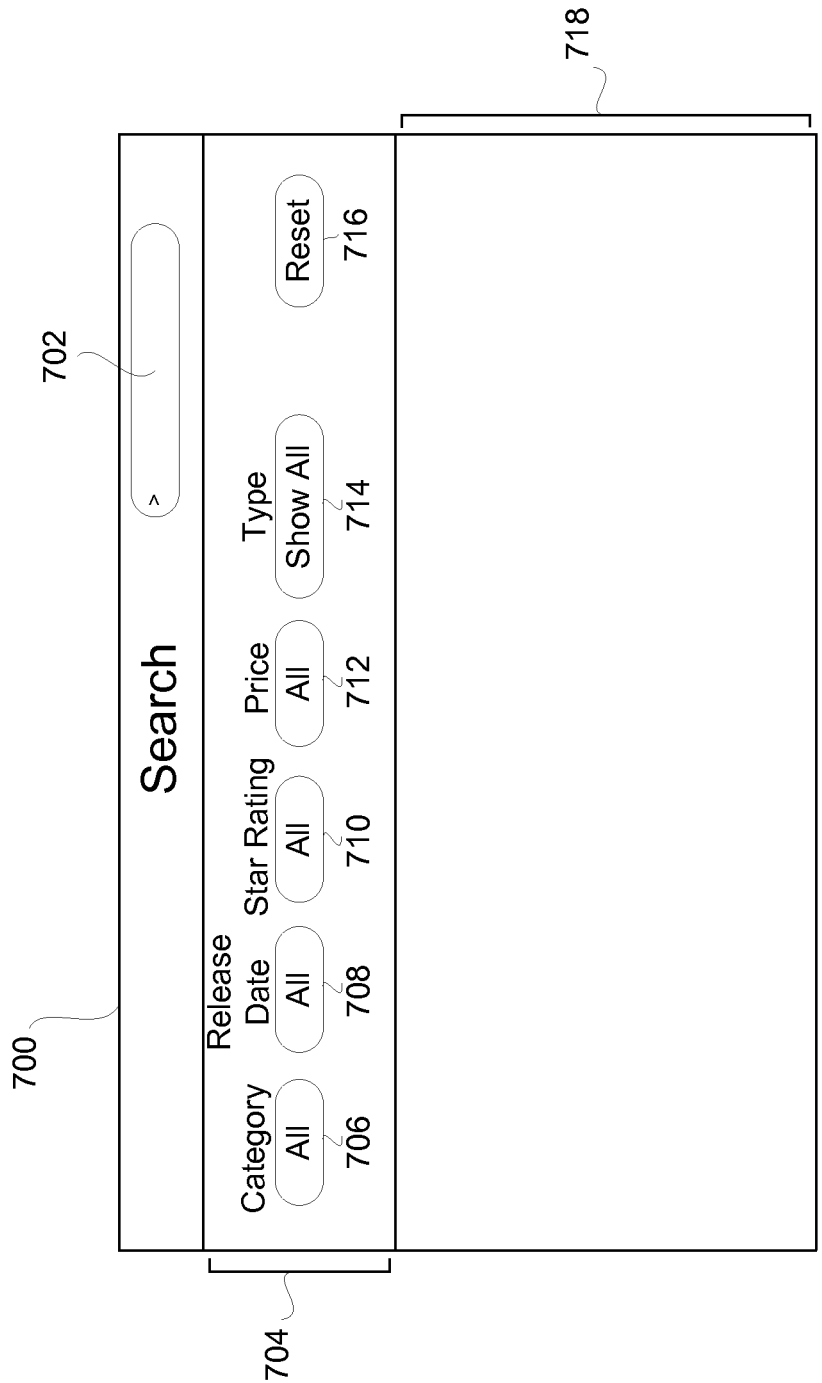

FIG. 7A is an illustration of a search GUI 700 according to one embodiment. The search GUI 700 can include a search box 702 capable of receiving a search text string that has been input by a user. The search GUI 700 also includes a facet region 704 that includes one or more user-selectable facets that can impact a search to be performed. As illustrated in FIG. 7A, the facet region 704 can include a category facet 706, a release date facet 708, a star rating facet 710, a price facet 712, and a type facet 714. Besides these illustrated facets, other facets can be additionally or alternatively utilized depending upon the particular implementation. Also, in the case of the category facet 706, it should also be noted that an additional facet could pertain to a sub-category. For each of the facets 706-714, on selection, a list or menu of available items can be presented. A user can select one of the available items associated with each of the facets. For example, the category facet 706 can include a list of selectable categories. Examples of categories for mobile device software applications can include: all, books, business, education, entertainment, finance, games, healthcare & fitness, lifestyle, medical, music and navigation. The star rating facet 710 can provide a list of selectable ratings. Examples of ratings can include: all, 5 star, 4 star, 3 star and 2 star. The type facet 714 can provide a list of selectable types of electronic devices for which the digital assets are to be usable on. Examples of types can include: all, netbook (e.g., iPad™) and smart phone (e.g., iPhone™).

The facet region 704 can also include a reset facet 716. Upon user selection of the recent facet 716, all the facets 706-714 can all reset to their default state, as illustrated in FIG. 7A.

Still further, the search GUI 700 can also include a results region 718. Here, the results of a search that has been performed in accordance with a search text string provided in the search text string box 702 as well as in accordance with the plurality of facets within the facet region 704. The results of the search can be presented in the results region 718 in a variety of different ways. For example, the results of the search can be presented as a list of matching digital assets, namely digital media assets. As discussed above, the results of the search can be ranked in accordance with usage data. However, as illustrated, since the search text string box 702 is empty, no search has been performed and thus the results region 718 is empty.

Figure 7B:
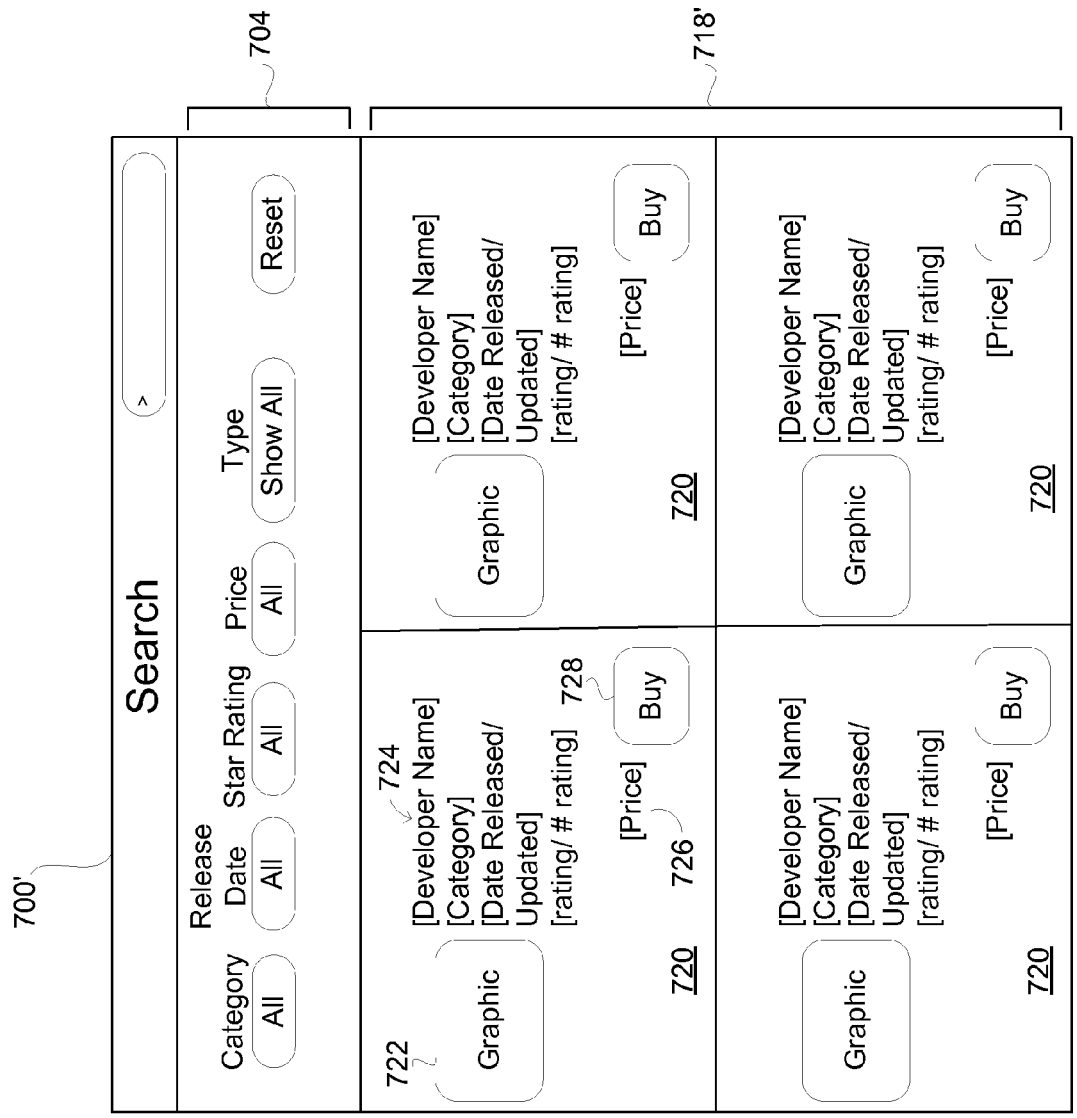

FIG. 7B is an illustration of a search GUI 700' according to one embodiment. The search GUI 700' represents the search GUI 700 illustrated in FIG. 7A in which the results region 718 is now represented as the results region 718'. Here, representative search results are depicted in the results region 718'. As an example, the results region 718' illustrated in FIG. 7B illustrates four (4) distinct digital media assets 720 being concurrently represented. These four distinct digital media assets 720 are all or part of a set of digital media assets that are the search results. In this illustrated embodiment, for each of the digital media assets 720, the representation can, for example, include a graphic 722, descriptive information 724, a price 726 and a "buy" button 728. The graphic 722 can pertain to an image associated with the digital media asset 720. For example, the image can pertain to a representative image (e.g., an album cover or a poster), a corporate logo, and the like. The descriptive information can, for example, provide artist or developer name, category, date released or updated, and/or rating information. The rating information can, for example, include a rating as well as a number of ratings that form the basis for the rating.

Figure 7C:
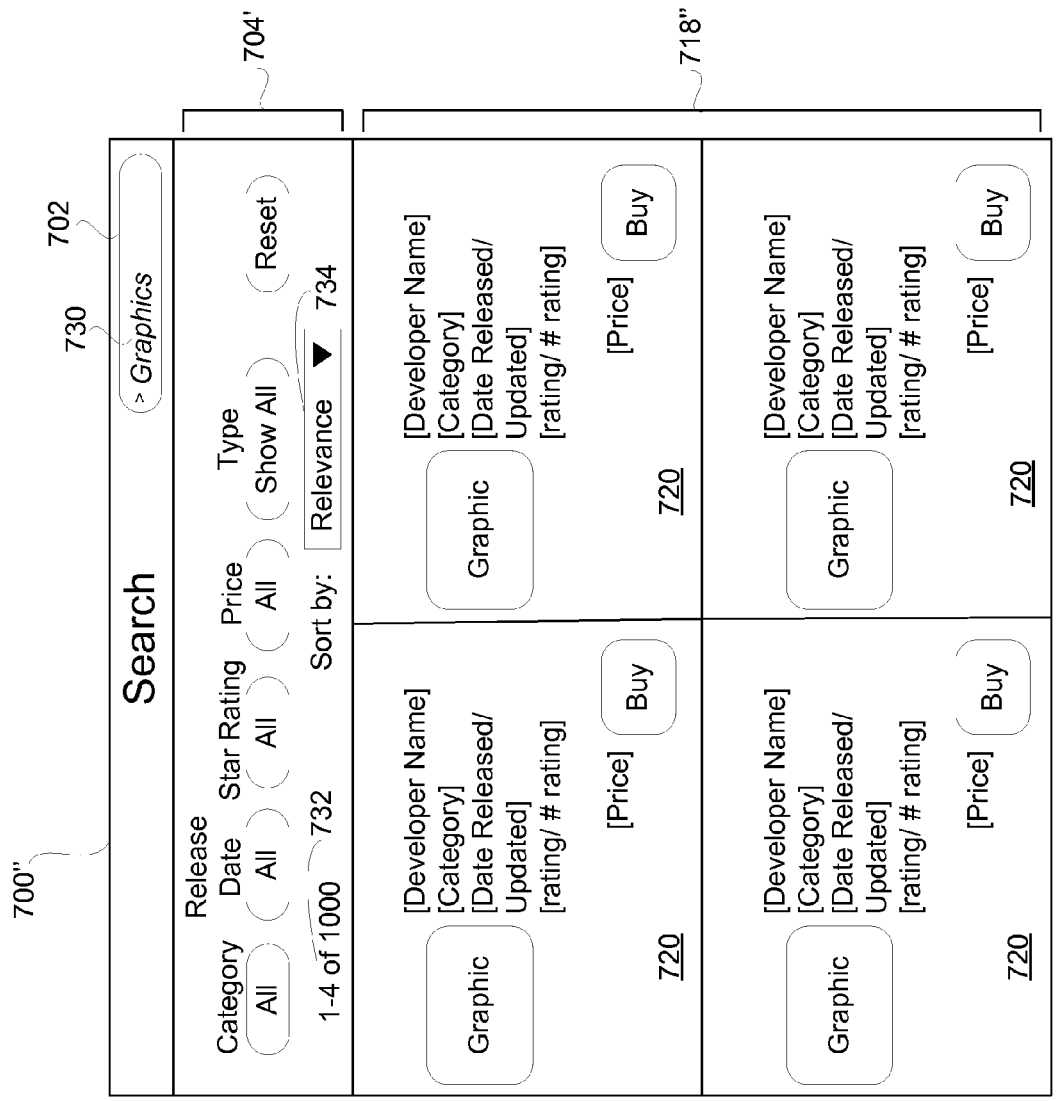

FIG. 7C is an illustration of a search GUI 700'' according to one embodiment. The search GUI 700'' represents the search GUI 700 illustrated in FIG. 7A in which a specific search has been requested. In this example, the search key word "graphics" 730 has been entered into the search box 702. The plurality of facets within the facet region 704' remain in their default settings. The results of the search are partially presented in the results region 718''. Each of the digital media assets 720 that match the keyword 730 as well as the facet settings can be presented similar to that discussed above in FIG. 7B. Additionally, the facet region 704' includes a numerical reference 732 and a sort control 734. The numerical indicators 732 can specify the number of digital media assets that match the search criteria. In addition, the numerical indicators 732 can also indicate those of the set of digital media assets that match the search criteria are being presented. For example, as shown in FIG. 7C, and the numerical indicator specifies "1-4 of 1000", meaning that the first four of the matching digital media assets are presented in the results region 718''. The sort control 734 is a user selectable control and that enables a user to sort the matching digital media assets within the results region 718''. By sorting the matching digital media assets, the order in which the various digital media assets are presented can be controlled.

FIG. 7D is an illustration of a search GUI 700''' according to one embodiment. The search GUI 700''' represents a modification to the GUI 700'' illustrated in FIG. 7C. Specifically, several of the facets within the facet region 704'' have been user selected so as to specify different search criteria than the default criteria. Specifically, the category facet 706 has been selected to the category "Games", and the release date facet 708 has been selected to limit the release date to "This Month", and the star rating facet 710 has been selected to limit the search results to those digital media assets having a star rating of at least "5 stars". It should also be noted that the numerical indicator 732' is also updated to reflect that the number of matching digital media assets has now been reduced to 210 through use of the search criteria imposed by the facets 706, 708 and 710 which serves to further limit the scope of the search. The digital media assets 720 being depicted in the results region 718''' are not necessarily the same digital media assets being presented in the results region 718'' shown in FIG. 7C.

Although the facets 706-714 discussed above in FIGS. 7A-7D are user-selected, in another embodiment, one or more of the facets 706-714 can be automatically selected based on usage data. In such an embodiment, a user could allow the electronic device to determine the facet settings based on usage data. As discussed above, usage data can be monitored and then used for customization. Here, the usage data can be used to automatically set one or more of the facet settings. The search GUI could, as an example, not present the facets 706-714 for user selection if the facets were automatically selected. However, even if the facets are automatically determined by the electronic device, a user may still desire that the facets 706-714 be displayed so as to be able to over-ride or set one or more of the facets.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for processing a search request, the method comprising:
   receiving a search request from an electronic device, the search request including one or more search criteria;
   searching a database in accordance with the one or more search criteria to obtain search results, the database including digital asset information pertaining to a plurality of digital media assets and the search results corresponding to different digital media assets;
   monitoring usage of the electronic device to determine usage data, wherein monitoring the usage includes determining a level of completion of a digital media asset consumed by the electronic device;
   determining, based on the level of completion of the digital media asset consumed by the electronic device, that a particular type of digital media asset is of more interest to a user of the electronic device compared to another type of digital media asset when the level of completion of the digital media asset consumed by the electronic device has exceeded a trigger point of the digital media asset, wherein the trigger point indicates a position in the digital media asset;
   ranking the search results based at least in part on the usage data and the particular type of digital media asset determined to be of more interest to the user compared to the other type of digital media asset, wherein ranking the search results includes increasing a ranking for digital media assets belonging to the determined particular type of digital media assets compared to digital media assets of the other type within the search results; and
   presenting the ranked search results via the electronic device.

2. The method of claim 1, wherein the search results includes resultant digital asset information pertaining to a subset of the plurality of digital media assets.

3. The method of claim 1, wherein the usage data pertains to historical usage of the electronic device or its user.

4. The method of claim 1, wherein the searching is influenced by the usage data.

5. The method of claim 1, wherein the one or more search criteria comprises one or more search facets that further limit a scope of the search, and wherein presenting the ranked search results comprises displaying information concerning a set of the digital media assets that fall under the one or more search facets.

6. The method of claim 5, wherein the one or more search facets are automatically determined by the electronic device.

7. The method of claim 5, wherein the one or more search facets are each individually user-selectable.

8. The method of claim 1, further comprising:
   enabling purchase of at least a portion of the ranked search results;
   determining whether a purchase request with respect to the ranked search results has been received; and
   purchasing at least the portion of the ranked search results when the purchase request has been determined to be received.

9. The method of claim 1, wherein a category of a digital media asset is one of a group consisting of a television show, a musical piece, a video, an electronic book, an audiobook, a software game, and a podcast.

10. The method of claim 1, wherein searching the database includes searching digital media assets resident at a local repository of the electronic device and digital media assets resident at a remote repository associated with an online media server.

11. The method of claim 1, wherein the position of the trigger point in the digital media asset is dependent upon the particular type of the digital media asset and duration of the digital media asset.

12. The method of claim 1, wherein different types of digital media assets have trigger points in different positions of the digital media assets.

13. The method of claim 1, wherein the plurality of digital media assets corresponds to a plurality of mobile device software applications, wherein the plurality of mobile device software applications includes at least one of a book application, a business application, an education application, an entertainment application, a finance application, a game application, a healthcare and fitness application, a lifestyle application, a medical application, a music application, or a navigation application.

14. The method of claim 1, wherein presenting the ranked search results includes presenting a representation of a software application, descriptive information for the software application, and a price to acquire the software application.

15. A computer readable memory encoded with a set of program instructions that, when executed, causes a processor to execute a method, the method comprising:
receiving a search request from an electronic device, the search request including one or more search criteria;
searching a database in accordance with the one or more search criteria to obtain search results, the database including digital asset information pertaining to a plurality of digital media assets and the search results corresponding to different digital media assets;
monitoring usage of the electronic device to determine usage data, wherein monitoring the usage includes determining a level of completion of a digital media asset consumed by the electronic device;
determining, based on the level of completion of the digital media asset consumed by the electronic device, that a particular type of digital media asset is of more interest to a user of the electronic device compared to another type of digital media asset when the level of completion of the digital media asset consumed by the electronic device has exceeded a trigger point of the digital media asset, wherein the trigger point indicates a position in the digital media asset;
ranking the search results based at least in part on the usage data and the particular type of digital media asset determined to be of more interest to the user compared to the other type of digital media asset, wherein ranking the search results includes increasing a ranking for digital media assets belonging to the determined particular type of digital media assets compared to digital media assets of the other type within the search results; and
presenting the ranked search results via the electronic device.

16. The computer readable storage medium of claim 15, wherein the search results includes resultant digital asset information pertaining to a subset of the plurality of digital media assets.

17. The computer readable storage medium of claim 15, wherein the one or more search criteria are determined automatically based on the usage data.

18. The computer readable storage medium of claim 15, wherein the method further comprises:
receiving a user selection for at least one of the one or more search criteria.

19. The computer readable storage medium of claim 15, wherein presenting the search results comprises displaying information concerning a set of the digital media assets that match at least the one or more search criteria.

20. The computer readable storage medium of claim 15, wherein the one or more search criteria are presented as user interface elements on a display device associated with the electronic device, and wherein the user interface elements are user-selectable.

21. The computer readable storage medium of claim 15, wherein at least one of the user interface elements enable selection of one of a list of selectable search criteria.

* * * * *